J. P. NIKONOW.
SAFETY DEVICE FOR STARTING MOTORS.
APPLICATION FILED MAR. 7, 1913.
1,130,010.
Patented Mar. 2, 1915.
2 SHEETS—SHEET 1.
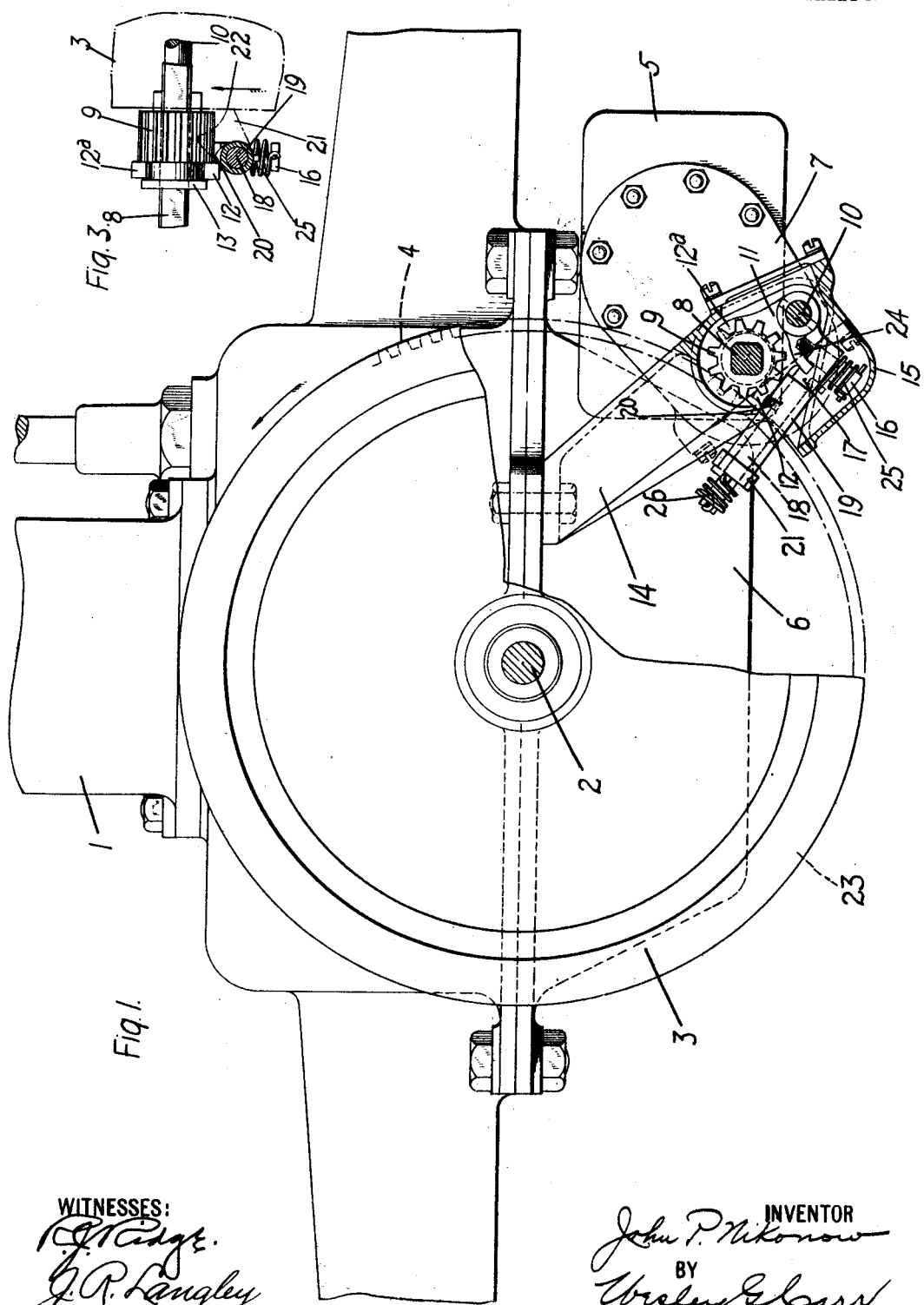

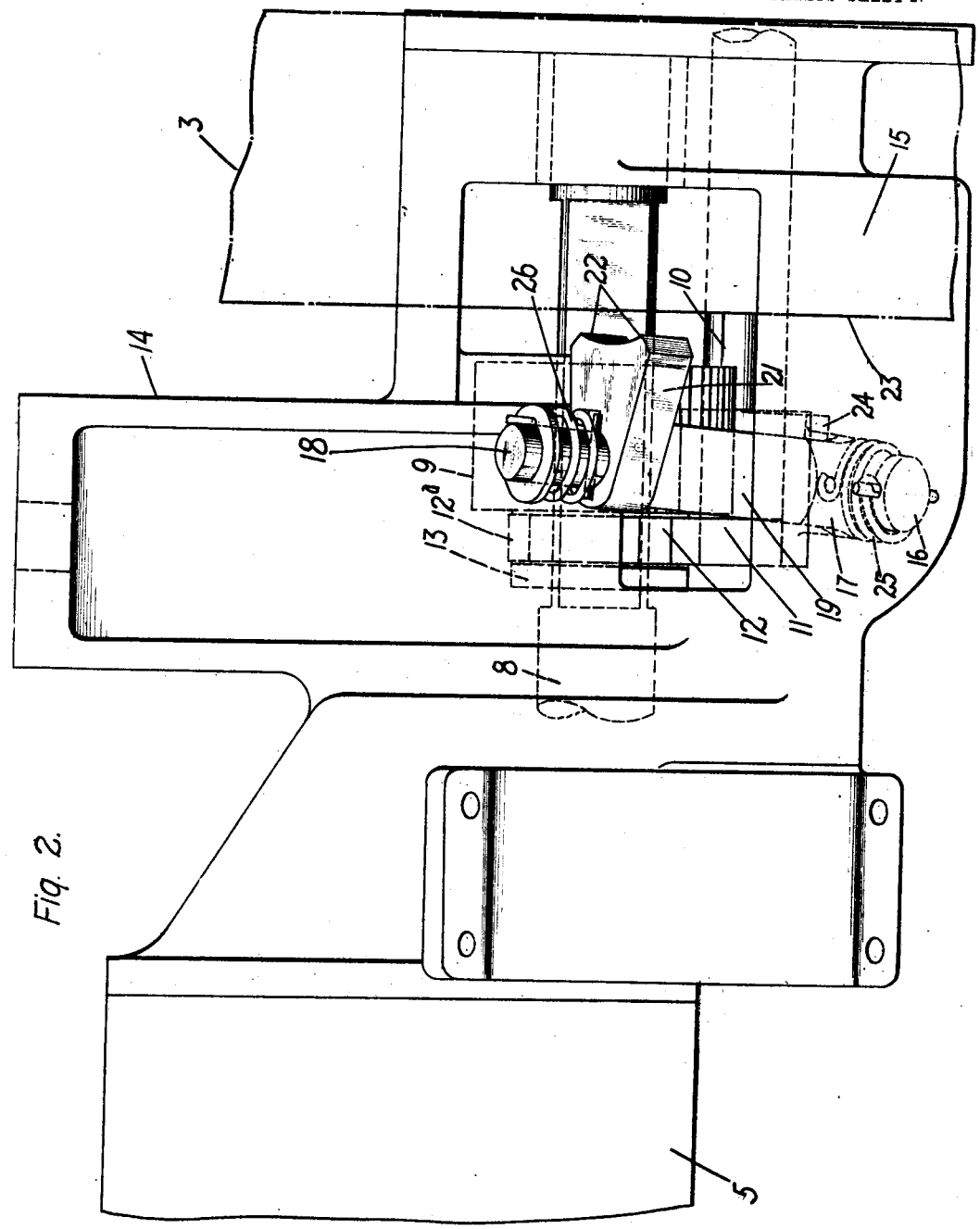

UNITED STATES PATENT OFFICE.

JOHN P. NIKONOW, OF PITTSBURGH, PENNSYLVANIA, ASSIGNOR TO WESTINGHOUSE ELECTRIC AND MANUFACTURING COMPANY, A CORPORATION OF PENNSYLVANIA.

SAFETY DEVICE FOR STARTING-MOTORS.

1,130,010.  Specification of Letters Patent.  Patented Mar. 2, 1915.

Application filed March 7, 1913. Serial No. 752,633.

*To all whom it may concern:*

Be it known that I, JOHN P. NIKONOW, a subject of the Czar of Russia, and a resident of Pittsburgh, in the county of Allegheny and State of Pennsylvania, have invented a new and useful Improvement in Safety Devices for Starting-Motors, of which the following is a specification.

My invention relates to safety devices for starting motors and it has for its object to provide a mechanism for preventing injury to the gear mechanism which connects the starting motor to the engine shaft of an automobile or other motor vehicle.

In the use of starting motors for engines of automobiles, it is common practice to connect the motor to the engine shaft by means of reduction gear mechanism which comprises one member mounted to rotate with the engine shaft. A pinion, operatively connected to the motor, is shifted to mesh with the gear wheel of the engine shaft when it is desired to start the engine. The fly wheel is customarily utilized to form or carry the gear wheel fixed on the engine shaft, and, as is well known, the fly wheel has a high peripheral speed when the engine operates under its own power. In case the operator accidentally or inadvertently attempts to mesh the gear wheel and pinion when the engine is running it is practically certain that the teeth of the gear mechanism will be broken.

My invention provides a mechanical structure which automatically locks the pinion out of engagement with the gear wheel when the engine is running, but allows the pinion and gear wheel to be meshed when the engine is stationary.

The details of my invention are described in connection with the accompanying drawings in which—

Figure 1 is an end view, partially in elevation and partially in section, of an engine and starting mechanism with my invention attached thereto, parts being broken away. Fig. 2 is an enlarged view of a safety device and related parts, parts being broken away. Fig. 3 is a reduced view partially in elevation and partially in section, of the safety device in its locking position, parts being broken away.

The engine 1, is provided with a crank shaft 2 and a fly wheel 3 having gear teeth 4 formed in its periphery. A starting motor 5, which may be of any type desired but is here shown as a dynamo electric machine, is supported in any suitable manner by the crank case 6 of the engine or by the frame (not shown). The motor is connected by suitable gear wheels, which are inclosed by a casing 7, to a rotatable shaft 8 upon which a pinion 9 is slidably mounted. The pinion 9 is shifted axially on the shaft 8 into and out of mesh with the fly wheel gear teeth 4 by means of a pedal or lever (not shown) which is located within convenient reach of the operator and is connected by a shift rod 10, shown in section in Fig. 1, to a bifurcated yoke member 11 having arms 12 and 12$^a$ which engage a grooved collar 13 integral with, or rigidly connected to, the pinion 9. The shaft 8 is supported by a bracket 14 attached to the crank case 6, as shown by breaking away a portion of the fly wheel 3 in Fig. 1. A casing 15, which is integral with the bracket 14, partially incloses the pinion 9 and its associated parts.

A safety device is carried by the yoke member 11 and comprises a stud 16 upon which is pivotally mounted a pin 17 which has a reduced portion 18 to form a pivotal support for a cylindrical sleeve member 19 which is provided with a projecting lug 20 and which has integral with it a member 21 of approximately triangular shape. A projecting end of the member 21 is provided with two hardened edges 22 which normally project beyond the plane of that end of the pinion 9 which is nearest the fly wheel 3, and which engage the flange 23 of the fly wheel 3 when the pinion is shifted to mesh with the fly wheel gear teeth 4. The pin 17 is normally held in the position shown in Fig. 2, against a stop 24, by a spring 25. The triangular member 21 is normally held in the position shown in Fig. 2, by a spring 26. The normal positions of the various parts of my invention are shown in Fig. 2. When the engine is stationary and it is desired to start it, the operator presses a pedal (not shown) to actuate the shift rod 10 and the yoke member 11 to shift the pinion 9 on the shaft 8 toward the fly wheel 3. The safety device is carried by the yoke member 11 and the edges 22 engage the flange 23 of the fly wheel 3, the position of which is indicated by broken lines in Figs. 2 and 3, before the respective gear teeth are in engagement. The further movement of the yoke member 11 causes the stud 16 to advance and the pin 17 is rocked on its pivot against the tension of the spring 25 until the pinion 9 is in mesh with the fly wheel gear teeth 4. The motor is operated through suitable electrical connections, not shown, to rotate the engine shaft by means of the gear mechanism above described. When the fly wheel rotates in the direction of the arrows of Figs. 1, 2 and 3, the triangular member 21 is rocked on the pin 17 against the tension of the spring 26 until the edges 22 are out of engagement with the edges of the flange 23. When the engine starts under its own power and the operator releases the pedal, the shaft rod 10 is retracted by a spring (not shown) and the pinion 9 is withdrawn from the fly wheel gear teeth 4. When the triangular member 21 is rocked on its pivot 18 by the fly wheel, the lug 20 is placed in the path of the arm 12. In the backward movement of the yoke member 11 and pinion 9, the arm 12 engages the lug 20 and rocks the triangular member 21 farther on its pivot until the yoke member 11 has passed, when the sleeve member 19 and the triangular member 21 are free to be returned to their normal positions by the springs 25 and 26, respectively.

In case the operator should attempt to mesh the pinion 9 with the fly wheel teeth 4 when the engine is running or the fly wheel is rotating from any other cause, the triangular member 21, as before, engages the flange 23 of the fly wheel before the teeth of the pinion 9 engage the fly wheel gear teeth 4. The flange 23 carries the edges 22 in the direction of rotation of the fly wheel and the triangular member 21 is instantly rocked on its pivot 18 to the position shown in Fig. 3. The lug 20 on the sleeve 19 is now in the path of the arm 12, and further forward movement of the yoke 11 and the pinion 9 is thus prevented. When the operator releases the pedal, the several springs return the pinion and the safety device to their normal positions, shown in Fig. 2.

From the above described construction and operation of my invention, it may be readily understood that I have provided an interlock for a starting motor and an engine shaft which will positively prevent the engagement of the gear teeth of the connecting mechanism when one member of the mechanism is rotating.

I claim as my invention:

1. In combination, two gear wheels, one of said gear wheels being shiftable into and out of mesh with the second gear wheel, means for shifting said first gear wheel, and a safety device carried by said shifting means, said device comprising a pin having a pivotal support, means for yieldingly holding said pin in one position, and means for engaging said second gear wheel in advance of said first gear wheel.

2. In a starting mechanism, the combination with a shaft, a gear wheel on said shaft, a pinion shiftable into and out of mesh with said gear wheel, and means for shifting said pinion, of a member having pivotal supports at right angles the one to the other, and means on said member for engaging said gear wheel and for engaging said shifting means.

3. In combination, two gear wheels, means for shifting one of said wheels into and out of mesh with the second wheel, and a safety device carried by said shifting means, said device comprising a pin having a pivotal support, a member pivotally supported on said pin and having a projecting lug and means for engaging said second gear wheel.

4. In a starting mechanism, the combination with a shaft, a gear wheel fixed on said shaft, a pinion shiftable into and out of mesh with said gear wheel, and means for shifting said pinion, of means for preventing the engagement of said gear wheel by said pinion when said gear wheel is rotating, said preventing means comprising a pivotally mounted pin, a member pivotally mounted on said pin, and projections on said member adapted to engage said gear wheel and said shifting means, respectively.

5. In a starting mechanism, the combination of a shaft, a gear wheel fixed on said shaft, a pinion shiftable into and out of mesh with said gear wheel, and a safety device shiftable with said pinion, said safety device comprising two members having pivotal supports at right angles, the one to the other, and means on one of said members for engaging said gear wheel in advance of said pinion and for engaging said shifting means.

6. In combination, two gear wheels, one of said gear wheels being shiftable into and out of mesh with the second gear wheel, means for shifting said first gear wheel, and a safety device on said shifting means, said device comprising a member having a pivotal support, and a second member pivotally supported by said first member and having means for engaging said first gear wheel and for engaging said shifting means when said first gear wheel is rotating.

7. In a starting mechanism, the combination with an engine shaft and a gear wheel fixed on said shaft, of a pinion shiftable into and out of mesh with said gear wheel, means for shifting said pinion, and a safety device carried by said shifting means, said safety device comprising a member having a pivotal support, a second member having a pivotal support on first said member at right angles to said first support, means on said second member for engaging said gear wheel in advance of said pinion, and means on said second member for engaging said shifting means.

8. In a starting mechanism, the combination with an engine shaft, a gear wheel on said shaft, a motor, a shiftable pinion operatively connected to said motor, and means for shifting said pinion, of a member having pivotal supports at right angles, the one to the other, projections on said member for engaging said gear wheel in advance of said pinion, a lug on said member to engage said shifting means when said member is rocked in one direction by said gear wheel, and means for returning said member to its normal position relative to said pivots.

In testimony whereof, I have hereunto subscribed my name this 26th day of February, 1913.

JOHN P. NIKONOW.

Witnesses:
HARRY T. GEORGE,
B. B. HINES.

Copies of this patent may be obtained for five cents each, by addressing the "Commissioner of Patents, Washington, D. C."